United States Patent [19]

Melchior

[11] 4,051,890
[45] Oct. 4, 1977

[54] DIRECTIONAL HEAT TRANSFER UNIT

[76] Inventor: August S. Melchior, Rte. 4, Box 156, Wilson, N.C. 27893

[21] Appl. No.: 687,561

[22] Filed: May 18, 1976

[51] Int. Cl.² .............................................. F28F 13/00
[52] U.S. Cl. ..................................... 165/32; 165/106; 165/86; 126/271
[58] Field of Search ................... 165/105, 106, 32, 86; 126/271

[56] References Cited

U.S. PATENT DOCUMENTS

| | | | |
|---|---|---|---|
| 3,225,820 | 12/1965 | Riordan | 165/32 X |
| 3,347,309 | 10/1967 | Webb | 165/105 X |
| 3,391,728 | 7/1968 | Kelly | 165/32 |
| 3,478,819 | 11/1969 | Reinke | 165/32 |
| 3,875,926 | 4/1975 | Frank | 165/105 X |

Primary Examiner—Albert W. Davis, Jr.
Attorney, Agent, or Firm—A. Yates Dowell, Jr.

[57] ABSTRACT

A heat transfer apparatus having a heat collector on one side of a wall and such collector contains an expandable fluid medium which communicates with a heat dissipating member and causes such member to be extended through the wall to transfer the heat to a location remote from the heat source.

6 Claims, 4 Drawing Figures

DIRECTIONAL HEAT TRANSFER UNIT

BACKGROUND OF THE INVENTION

1. Field of the Invention

This invention relates generally to the absorption and transfer of heat and relates particularly to a heat transfer apparatus which may be subjected to a source of heat and in which an expandable fluid medium moves a heat pipe through a wall to transfer such heat to a remote location.

2. Description of the Prior Art

Heretofore many heat exchangers and heat transfer units have been provided for removing heat from a fluid such as a refrigerant, as well as to absorb heat from a heat source and dissipate the same to the atmosphere or transfer the heat to a storage facility. Many of these prior art devices have been utilized primarily to prevent overheating of a machine or other heat source by removing the heat and dissipating the same to atmosphere or to another element as a waste byproduct, while other elements have been utilized primarily to absorb heat from a source and transfer the heat to a storage facility for subsequent use as a source of energy.

Some examples of prior art structures are disclosed in U.S. Pat. Nos. 2,692,483 to Hedlund; 3,229,755 to Komarow; 3,402,761 to Swet; 3,712,053 to Kofink; 3,812,005 to Hamerdinger et al; and 3,923,038 to Cutchaw.

SUMMARY OF THE INVENTION

The present invention is embodied in a directional heat transfer unit in which a heat collector is mounted on one side of a wall or barrier in a position to be exposed to a source of heat. The collector contains an expandable fluid medium which communicates with a hollow body and causes the hollow body to be extended through the barrier to a position where the heat may be removed. The distance which the body extends through the barrier is proportional so that the heat being absorbed on one side of the barrier is substantially in equilibrium with the heat being discharged on the other side of the barrier.

It is an object of the invention to provide a simple heat transfer unit which absorbs heat from one side of the barrier and transfers the heat to the other side thereof.

It is another object of the invention to provide a heat transfer unit having an expandable fluid medium for absorbing heat from a heat source and transferring such heat to a remote position.

DESCRIPTION OF THE PREFERRED EMBODIMENTS

Figure 1:
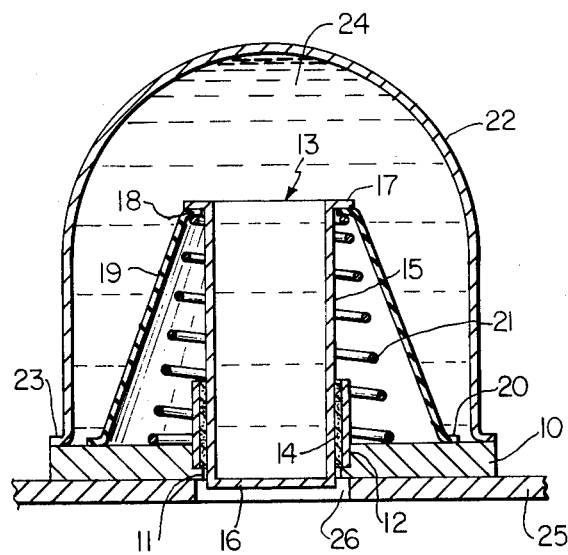
FIG. 1 is a vertical section illustrating the apparatus in a position such that substantially no heat is being transferred.

With continued reference to the drawing, the heat transfer unit of the present invention includes a base or barrier 10 having a central opening 11 extending therethrough. A guide sleeve 12 is fixed to the barrier 10 in concentric relationship with the axis of the opening 11 for supporting and guiding a heat pipe 13. If desired, a friction reducing liner 14, such as a felt padding or the like which is saturated with oil, may be disposed between the sleeve 12 and the body 13.

Figure 2:
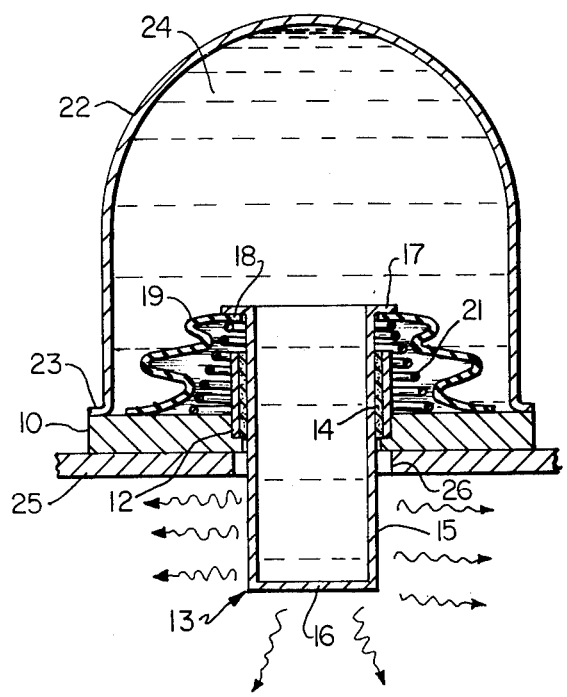
FIG. 2 is a vertical section similar to FIG. 1 illustrating the apparatus in position to transfer heat.
Figure 3:
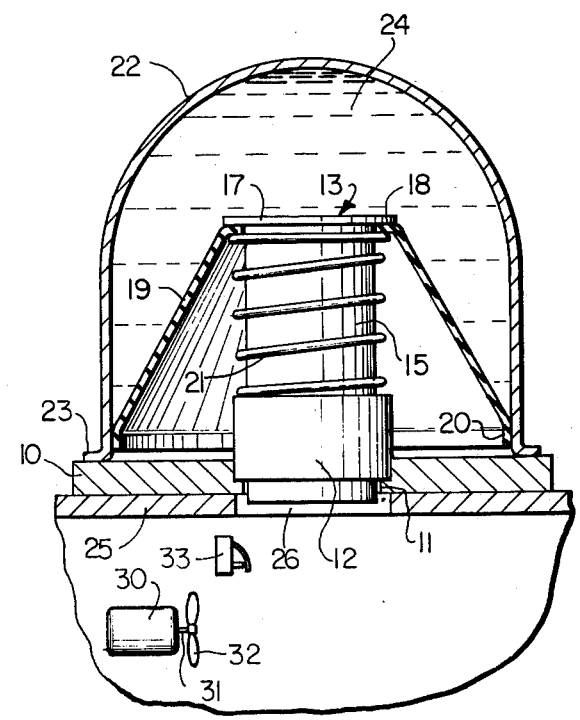
FIG. 3 is a vertical section illustrating a modified form of the structure of FIG. 1.

The body normally is constructed of metal such as copper, aluminum, silver or the like having good heat conducting characteristics and includes a generally tubular sleeve 15 having an imperforate end wall 16 at one end with the opposite end being open. The open end of the body is provided with an outwardly extending flange 17. An inwardly extending flange 18, located at the upper end of a flexible resilient skirt 19, is disposed beneath the flange 17 and is bonded or otherwise attached thereto. The skirt 19 is generally frusto-conical in cross-section and the lower end of such skirt is provided with a flange 20 which is bonded or otherwise attached in fluid-tight relationship to a fixed structure. With particular reference to FIGS. 1-3, the lower flange 20 is bonded or otherwise attached to the barrier 10. A resilient member such as a spring 21 is located between the body 13 and the skirt 19 and one end of such spring engages the flange 17 of the body, while the other end is supported on the barrier 10 so that the spring normally urges the open end of the body away from the barrier.

A dome shaped imperforate primary shield 22 constructed of material having good heat conducting qualities, such as copper, aluminum, silver or the like, entirely surrounds the body 13 and the skirt 19. Such shield has an outwardly extending flange 23 at the lower end by means of which the shield is mounted on the barrier 10 in fluid-tight relationship. If desired a conventional gasket (not shown) may be located between the flange 23 and the barrier 10 to insure the fluid-tight integrity of the interior of the shield 22. It is noted that the shield 22 could have any desired cross-sectional configuration, such as a frusto-conical configuration with a semi-spherical top. This type of configuration would present a larger heat exchange surface to the source of heat and may be preferred in some cases.

The space between the shield 22 and the body 13 and skirt 19 is filled with a heat expandable fluid medium 24 which may be either in a liquid or a gaseous state. Also, the fluid medium may be a liquid with a relatively low boiling point which changes to a gaseous state when heat is absorbed. Fluids such as ammonia, or a fluid of the fluorocarbon series such as freon (chlorodifluoromethane) or the like have been found to be particularly applicable. Since the body 13 is open, the fluid 24 completely fills such body.

In this embodiment the barrier 10 is mounted on a wall 25 or other structure which separates a heated space or area from a non-heated space or area with the barrier 10 being located on the side of the wall exposed to the source of heat. The wall 25 is provided with an opening 26 generally in alignment with the body 13. When heat is applied to the shield 22, such heat is absorbed by the heat expandable fluid medium 24 which causes such fluid medium to expand and overcome the tension of the spring 21. The heat of the fluid medium 24 is transferred to the walls of the hollow body 13 and the expansion of such fluid medium causes the body to extend through the opening 26 in the wall 25 so that the closed end of the body projects into the non-heated area to permit the heat from the body to be transferred to the non-heated area by radiation, convection or the like. As the heat is being removed from the body on the non-heated side of the wall 25, an equilibrium ordinarily is reached in which the heat being absorbed by the fluid medium is substantially equal to the heat being transferred from the body. Thus when only a small amount of heat is being absorbed by the fluid medium, the body extends only a short distance through the wall 25. However, if a large amount of heat is being absorbed, the body extends a substantially greater distance through the wall 25. When the heat from the heat source begins to abate, the fluid medium 24 contracts so that the spring 21 urges the body outwardly and withdraws the closed end from the non-heated area. Accordingly, it is apparent that heat is transferred in one direction only.

With particular reference to FIG. 3, a modified form of the invention is illustrated in which the flange 20 of the skirt 19 is bonded or otherwise attached to the shield 22 to reduce the possibility of leakage of the heat expandable fluid medium. Additionally the spring 21 has been illustrated as being a coil spring with one end engaging the flange 17 while the other end is supported on the guide sleeve 12. In this embodiment a mechanical apparatus is provided for assisting in the transfer of heat from the body and such apparatus may include a motor 30 having a shaft 31 on which a fan blade 32 is mounted. The motor 30 is adapted to be selectively energized in any desired manner, as by a microswitch 33 which is engaged by the body 13 as the body extends through the opening 26, or such motor can be selectively operated in any other conventional manner, as by a thermostatically controlled switch or the like (not shown).

Figure 4:
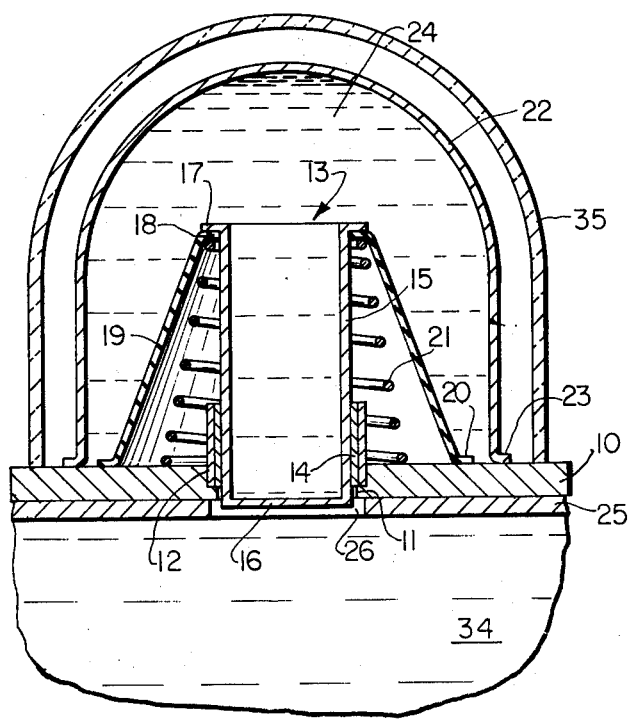
FIG. 4 is a vertical section of another embodiment which is used for collecting solar heat energy.

With particular reference to FIG. 4, the heat transfer unit has been adapted for use with a solar heating system in such a manner that heat energy from the sun may be absorbed by the heat expandable fluid medium 24 and stored for subsequent use. In this embodiment the barrier 10 is mounted on the wall 25 of a tank, pipe, or container in which a liquid 34, such as water or the like, is located. It is noted that the liquid 34 may be flowing past the body 13 energized by a conventional motor and pump (not shown) to transfer the heat to a heat storage area, or the heat transfer unit may be mounted directly on a tank of quiescent water or other liquid in which the tank functions as a heat storage unit.

In this embodiment a secondary shield 35 constructed of transparent material, such as glass or the like, is provided which permits the heat rays from the sun to penetrate through the secondary shield to the primary shield 22. The secondary shield 35 normally is spaced from the primary shield 22 to aid in blocking the natural convection of heat from the shield 22.

I claim:

1. Apparatus for transferring heat from a heat source to a remote location comprising a base having an opening therethrough, a hollow body means normally disposed on one side of said base but mounted for movement through the opening of said base, said body means being closed at one end and open at the other end, flexible resilient skirt means connecting said other end of said body means to said base, shield means mounted on said base in spaced relationship with said skirt means and said other end of said body means, a heat expandable fluid medium entirely filling the space between said shield means and said skirt means as well as entirely filling said body means, whereby heat absorbed by said fluid medium causes said medium to expand and move a portion of said body means through the opening in said base so that heat in said body means is dissipated on the other side of said base.

2. The structure of claim 2 including resilient means located between said base and said other end of said body means for urging said other end of said body means away from said base.

3. The structure of claim 1 including a second shield means of transparent material mounted on said base, said second shield means enclosing said first mentioned shield means and being in spaced relationship thereto.

4. The structure of claim 2 including guide means mounted on said base generally concentrically of said opening, said guide means slidably receiving and guiding said body means.

5. A heat transfer unit for absorbing heat from a heat source and transferring the heat to a remote location comprising a base having first and second sides with an opening therethrough, guide means carried by said base generally concentrically of said opening, a hollow tubular body slidably carried by said guide means, one end of said body being closed and the other end being open, a flexible resilient skirt having one end connected to said open end of said body and the other end connected to said first side of said base, spring means for urging said open end of said body away from said first side of said base, an imperforate dome-shaped shield mounted on said first side of said base in spaced relationship with said body, a heat expandable fluid medium completely filling the space between said shield and said skirt and completely filling the interior of said body, whereby a substantial portion of the heat received by said shield is transferred to said medium and said body to cause said medium to expand and push portions of said body through the opening to the second side of said base where the heat is dissipated.

6. The structure of claim 5 including means on said second side of said base for removing heat from said body.

* * * * *